United States Patent
Hatano et al.

[11] 3,870,330
[45] Mar. 11, 1975

[54] SNOW SCOOTERS

[75] Inventors: Fukuji Hatano; Yukio Kobayashi, both of Tokyo, Japan

[73] Assignee: Gakken Co. Ltd., Tokyo, Japan

[22] Filed: Jan. 28, 1974

[21] Appl. No.: 437,466

[30] Foreign Application Priority Data
Mar. 5, 1973  Japan............................. 48-27396

[52] U.S. Cl. .............................................. 280/16
[51] Int. Cl. ........................................... B62b 13/04
[58] Field of Search....................... 280/16, 278, 287

[56] References Cited
UNITED STATES PATENTS
| | | | |
|---|---|---|---|
| 1,428,496 | 9/1922 | Villeneuve | 280/278 |
| 2,176,397 | 10/1939 | Flanders | 280/16 |
| 3,438,643 | 4/1969 | Spiehs | 280/16 |
| 3,561,783 | 2/1971 | Ellett | 280/16 |

Primary Examiner—Robert R. Song
Attorney, Agent, or Firm—Irving M. Weiner

[57] ABSTRACT

A disassemblable snow scooter including a steering part, a body, a footrest, and a braking device. The steering part includes a steering handle, a handle, a shaft supporting the handle, a front fork and a front ski plate. The body includes a rear ski plate, a frame, and a saddle for the operator of the scooter. The steering part is separably connected with the body and is rotatably connected to the curve frame upon which the saddle for the operator is positioned. The braking device includes braking plates which are pushed down by the feet of the operator into the snow in order to brake or stop the snow scooter.

8 Claims, 14 Drawing Figures

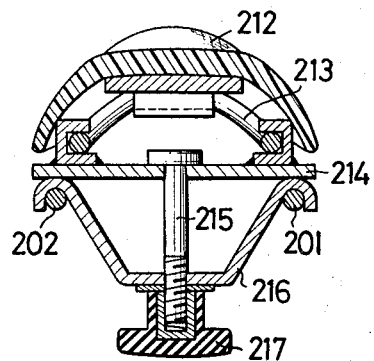
FIG. 9
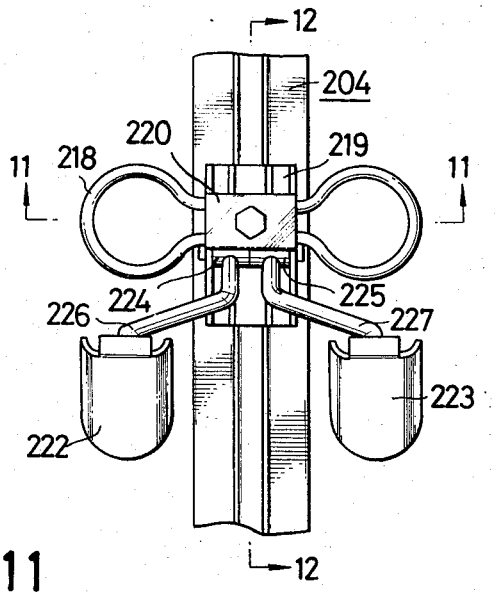
FIG. 10
FIG. 11
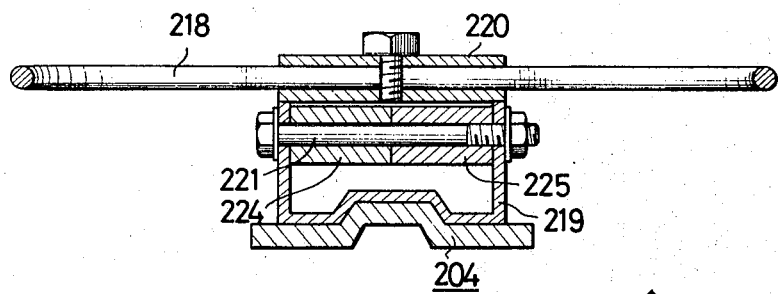
FIG. 12
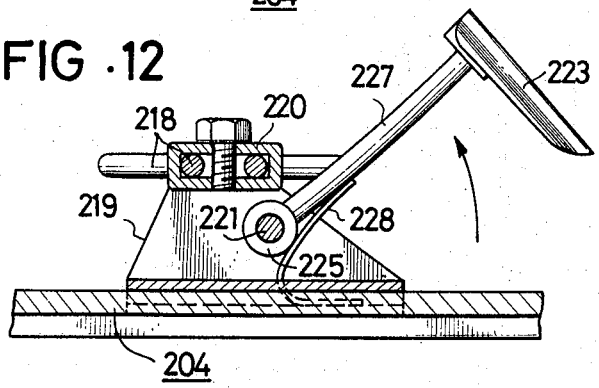

SNOW SCOOTERS

The present invention relates to snow gliders such as snow scooters, and more particularly to a snow glider which can be steered, is provided with braking means, is made to glide on snow by an operation similar to that of a bicycle or scooter, and can easily be assembled and disassembled.

BACKGROUND OF THE INVENTION

The snow glider according to the present invention is used for sports and the like. Such gliders for sports on snow, such as sleighs, snow bicycle and snow scooters, are becoming prevalent. However, it is inconvenient to transport them as assembled to skiing grounds and to house them as assembled when they are not being used. Particularly, as they are used only when there is snow in winter, the period in which they are not used is so long that it is inconvenient for the space and maintenance to house them as assembled in such period.

The present invention provides a snow glider which is convenient to transport and to house by taking into consideration the above-mentioned inconveniences.

SUMMARY OF THE INVENTION

The snow scooter according to the present invention comprises: a steering part consisting of a steering handle, handle, shaft supporting said handle, front fork and front ski plate; and a body provided with a rear ski plate and consisting of a frame having a saddle for the operator. The steering part is separably connected with the body and is rotatable by the operation of the handle to move the front ski plate to the right and left in steering the scooter. The steering part and body can be separated from each other. The steering part can be easily disassembled into the handle, handle shaft, front fork and front ski plate. The assembled body can be easily disassembled into the rear ski plate, frame and saddle.

The respective component parts can be assembled by fastening their connecting parts with fastening screws, and can be disassembled by disconnecting the connecting parts by loosening the screws. Therefore, the assembly and disassembly operations are very simple.

The snow scooter according to the present invention can be easily assembled and disassembled, and can be disassembled into respective component parts so as to be housed. All the component parts can be made so compact as to be housed in a small space very advantageously. Further, the respective component parts are so small and can be so easily separated from the assembled parts as to be convenient and advantageous for their maintenance. Further, it is so small in contour when disassembled that it can be contained in the trunk of a motor car so as to be transported to a skiing ground, and can be carried, is thus very convenient to transport. It can be assembled by a simple operation on the skiing ground so as to be used as a snow scooter, and is advantageous to transport to the destination. The snow scooter according to the present invention is provided with a braking means. The conventional glider is braked by changing the direction by operating the handle so that the glider may be lateral to the slope. However, such operation requires much skill and is dangerous because the glider may tumble laterally. Therefore, a sliding plate or the like is fitted to the foot of the operator so that the glider may be braked by its contact resistance on the snow surface. However, a strong braking resistance will be applied directly to the foot of the operator by braking with it during a high-speed gliding. Therefore, there is a problem in safety.

By taking such braking means mentioned above into consideration, the present invention provides a braking means which can positively and safely brake the glider while it is gliding on snow. The braking means is fitted to the rear ski plate. Braking plates are provided on the right and left separately from the operator's foot resting part so that, when these braking plates are trodden and pushed down with feet, the lower ends of the braking plates will contact with and bite into the snow surface to catch snow so that the glider may be braked by this frictional resistance. Therefore, the present invention provides a snow scooter provided with a braking means which can be positivly and safely braked by only treading brake pedals with feet.

BRIEF DESCRIPTION OF THE DRAWINGS

FIG. 9 is a sectioned view on line 9—9 in FIG. 1.
FIG. 10 is a plan view of a braking part.
FIG. 11 is a sectioned view on line 11—11 in FIG. 10.
FIG. 12 is a sectioned view on line 12—12 in FIG. 10.

DETAILED DESCRIPTION OF SOME PREFERRED EMBODIMENTS

Figure 1:
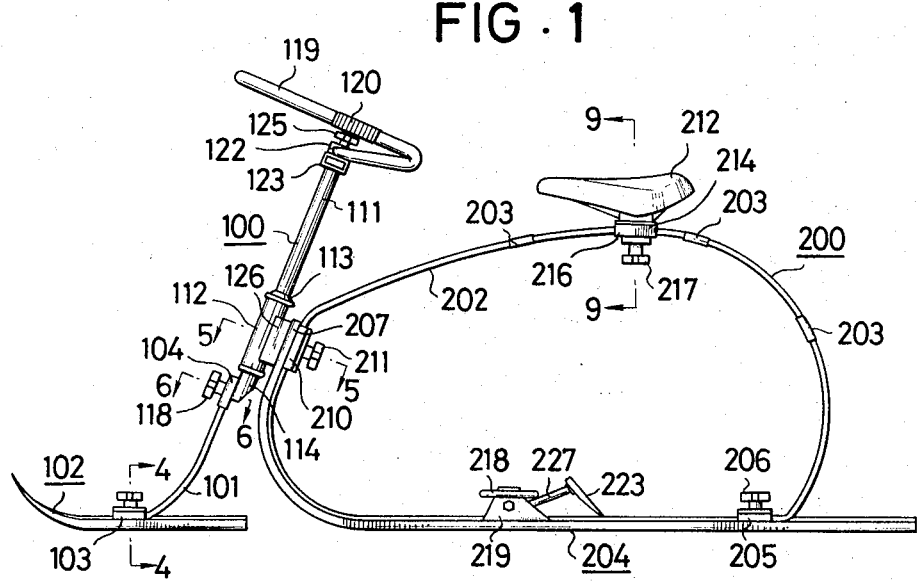
FIG. 1 is a side view of a snow scooter according to the present invention.
Figure 2:
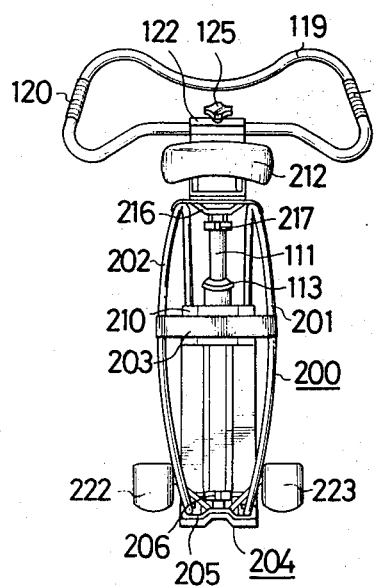
FIG. 2 is a rear view of the same.
Figure 3:
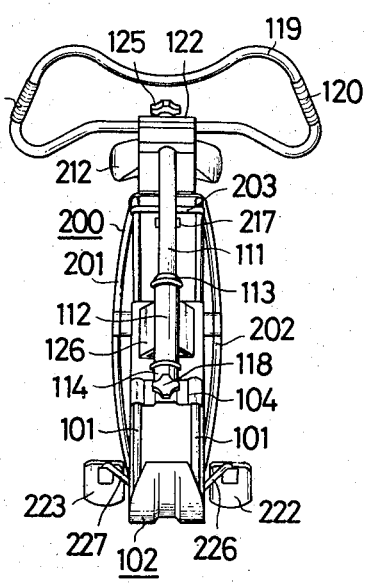
FIG. 3 is a front view of the same.

FIG. 1 is a side view of a snow scooter according to the present invention, and FIGS. 2 and 3 are front and rear views, respectively, of the same.

The snow scooter of the present invention comprises a steering part 100 having a front ski plate 102 and a body 200 connected with it. The steering part 100 has a front ski plate 102 supported by a front fork 101. The front fork 101 is formed by curving two bar members of round cross-section bent to be horizontal at the lower ends. Fork 101 is integrally connected at the upper and lower ends, respectively, with connecting plates 103 and 104 which are also spacers bent to be tubular on both sides so that the round-sectioned bar members of fork 101 may be fitted to be integral by welding or the like at the upper and lower ends in the tubularly bent parts on both sides of the connecting plates 103 and 104.

Figure 4:
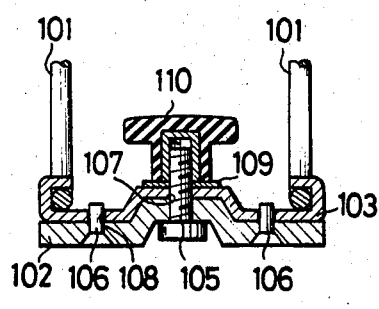
FIG. 4 is a sectioned view on line 4—4 in FIG. 1.

As shown in FIG. 4, a bolt 105 is provided to project upwardly from the center of the front ski plate 102, and regulating pins 106 are provided to project upwardly around this bolt 105. Holes 107 and 108, corresponding respectively to the bolt 105 and pins 106 of the front ski plate 102, are formed in the connecting plate 103 at the lower end of the above-mentioned front fork 101. The bolt 105 and pins 106 of the ski plate 102 are fitted respectively in the holes 107 and 108 of the connecting plate 103, and a grip nut 110 is screwed through a washer to the upper end of the bolt 105 projecting on the connecting plate 103 and the connecting plate 103 is integrally connected on the ski plate 102 by screwing and fastening this grip nut 110. The front fork 101 will thus be connected with the ski plate 102, when the grip nut 110 is loosened and is removed from the bolt 105, the front fork 101 and ski plate 102 will be separated from each other.

Figure 6:
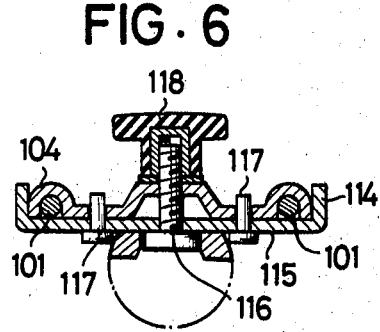
FIG. 6 is a sectioned view on line 6—6 in FIG. 1.
Figure 8:
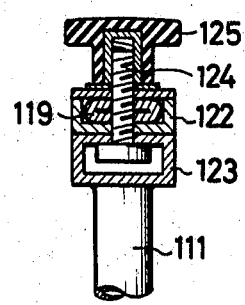
FIG. 8 is a sectioned view on line 8—8 in FIG. 7.
Figure 7:
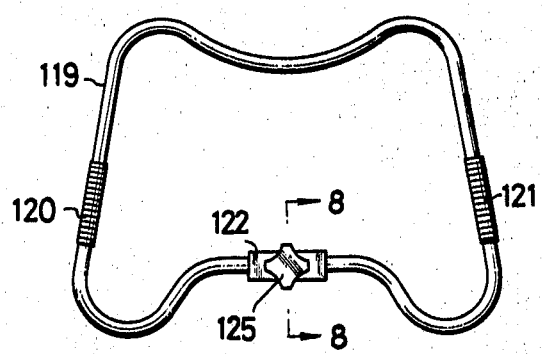
FIG. 7 is a plan view of a handle part.

A handle shaft 111 is rotatably fitted to a head tube 112 and is provided with a head locking ring 113 and a locking member 114 made like a flat plate 115 at the lower end to hold the head tube 112 in order to prevent the handle shaft 111 from being pulled out so that the head tube 112 may not slide axially. The flat plate part 115 of the locking member 114 has a bolt 116 and pins 117 the same as in the above-mentioned ski plate 102. The connecting plate 104 at the upper end of the front fork 101 has holes the same as in the connecting plate 103 at the lower end. By fitting these holes with the bolt 116 and pins 117 and screwing the grip nut 118 to the bolt 116, the handle shaft 111 is removably connected at the lowere end with the front fork 101 as shown in FIG. 6. By loosening the grip nut 118, the handle shaft can be separated from the front fork. A handle 119 formed by bending a pipe member so as to be of a contour like that of a plan view of butterfly wings. It is removably connected with the handle shaft 111 at the top, has gripping parts 121 and 120 formed respectively on the right and left and has a boss part 122 formed in the center of the rear part. As shown in FIG. 8, the boss part 122 consists of a channel member and flat plate and the depressed central part of the handle is fitted in the groove of this channel member and is pressed with the flat plate so that the flat plate may be integral with the channel member. The handle shaft 111 has in the top part a supporting part 123 corresponding to the boss part 122 of the handle, a bolt 124 is connected in the base part integrally with said supporting part 123, the hole made in the center of the boss part of the handle is fitted to said bolt 124 and a grip nut 125 is screwed to the upper end of the bolt the same as is mentioned above so that the handle 119 may be removably screwed and connected with the handle shaft 111. By removing the grip nut 125, the handle shaft 111 and handle 119 can be separated from each other. The handle 119 is made in the special form in the illustrated embodiment, but a conventionally used bar shaped handle may be selected.

Figure 5:
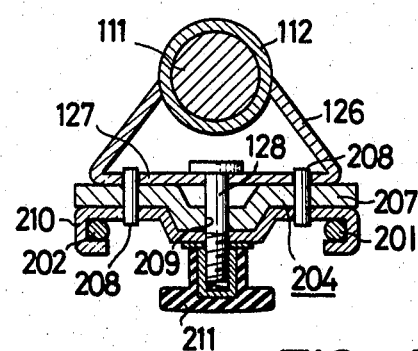
FIG. 5 is a sectioned view on line 5—5 in FIG. 1.

As shown in FIG. 5, a connecting frame 126, formed by bending a plate member to be triangular, is integrally connected by welding or the like on the rear side of the head tube 112 rotatably supporting the handle shaft 111 and is connected in the top part of the triangle with the head tube 112. A bolt 128 is provided in the center of a flat plate part 127 so as to project rearwardly integrally with the flat plate part. The body 200 consists of frame members 201 and 202 made by symmetrically bending two round-sectioned bars, providing spacers 203 at proper intervals and making the spacing between the round-sectioned bars 201 and 202 small in the front and rear, but large in other parts, and rear ski plate 204. A bolt and pins are provided to project in the rear part of the upper surface of the rear ski plate 204 in the same manner as in the front ski plate 102 and the same connecting plate 205 as the connecting plate for the front fork 101 is provided at the curved rear ends of the frame members 201 and 202 and is removably screwed and connected with the rear end of the frame through a grip nut 206 by fitting the screw and pins in the holes made in the connecting plate. By removing the grip nut 206, the rear ski plate 204 is also separated in the rear part from the rear end of the frame. The connection of the rear connecting plate 205 and rear ski plate 204 is the same as of the front ski plate 102 and the lower connecting plate 103 of the front fork, is of the same structure as in FIG. 4 and therefore is not illustrated.

The rear ski plate 204 is bent upwardly in the forward end part 207; pins 208 are provided to project on both sides of the forward end; and a hole 209 is formed in the center of the forward end. The bolt 128 of the flat plate part 127 of the connecting frame 126 of the above-mentioned head tube 112 is fitted in said hole 209. Holes to fit with the pins 208 are formed in advance in this flat plate part 127. A connecting plate 210 in the forward end parts of the frame members 201 and 202 is placed on the forward end part 207 of this ski plate. The connecting plate 210 has a hole the same as in the other connecting plates and the bolt 128 is fitted in this hole and is screwed and fastened with a grip nut 211. Thus, as shown in FIG. 5, the respective parts are removably screwed and connected so that the handle shaft 111, rear ski plate 204 and forward end part of the frame may be integrally connected. By removing the grip nut 211, the respective parts are disassembled.

A saddle 212 supporting the operator is provided in the center of the frame members 201 and 202 of the body 200 and is of a structure stably supporting the operator riding on it as in a bicycle saddle. As shown in FIG. 9, the saddle 212 is integrally fitted on a base plate 214 through a round-sectioned bar member 213 which is also a spring. A bolt 215 is provided to project downwardly on this base plate, is fitted through its hole in a connecting plate 216 which is also a spacer integrally provided in the center of the frame and is removably screwed and connected with a grip nut 217 from below. By removing grip nut 217, the saddle can also be removed from the frame.

As the saddle 212 is provided substantially in the center of the frame formed by curving the frame members 201 and 202 of round-sectioned bars, the frame will also act as a spring under the weight of the operator to protect him from shocks.

A foot resting part 218 is formed in a position in the center of the rear ski plate 204 and slightly forward of the saddle 212. As illustrated in FIGS. 10 to 12 and the foot resting part 218, right and left foot resting places are formed by bending a round-sectioned bar member to be in the form of a digit 8 so as to project on both sides of rear ski plate 204. The foot resting part 218 is connected through a holding member 220 with the top part of a channel-shaped member 219 fitted integrally on rear ski plate 204. A shaft 221 is laterally set in the upper part of the member 219 and tubular base parts 225 and 224 respectively of right and left braking plates 223 and 222 are fitted to this shaft 221 so that the braking plates 223 and 222 may rotate with the shaft 221 as a center.

The braking plates 223 and 222 are projected respectively to the right and left of rear ski plate 204 rods 227 and 226. The braking plates 223 and 222 are resiliently supported by such spring 228 as a plate spring interposed between the base parts 225 and 224 and member 219 and are normally pushed up as shown by the arrow in FIG. 12. Though the plate spring is used in the illustrated embodiment, a coil spring or any other spring may also be used.

In gliding, the operator mounts both feet on the right and left of the foot resting part and starts by kicking snow with the feet. The handle 119 is rotated to steer to the right and left. The handle 119 is connected with the front fork 101 of the front ski plate 102 to rotate the ski plate 102 to the right and left in steering.

In braking while gliding, the braking plates 222 and 223 are trodden with the feet so as to be pushed down against the resiliency and to be pushed into the snow at their lower ends to brake with this resistance. By controlling the force of treading down the braking plates 222 and 223, the braking can be applied gradually or quickly. As the braking operation is made by pushing down the braking plates 222 and 223, no shock will be applied directly to the feet and a very safe braking will be made. Further, the braking operation is so simple that no skill is required, the braking can be made positively and the speed can be controlled easily and positively.

This snow scooter is started by riding on the saddle 212 of the body 200, gripping the gripping parts 121 and 120 of the handle 119 with the right and left hands respectively, and kicking with both feet. By rotating the handle 119 to the right and left, the gliding direction can be changed. The braking on the snow is made by the above-mentioned operation of the braking plates 222 and 223.

As is evident from the above explanation, FIGS. 1 to 3 show the respective parts as assembled and subsequent drawings also show the respective parts as assembled.

When the grip nut 211 is removed, the steering part 100 and body 200 will be separated from each other. When the grip nuts 110 and 118 are removed, the front ski plate 102 and front fork 101 will be separated from each other. When the grip nut 125 is removed, the handle 119 will also be separated. Therefore, the steering part 100 can be disassembled into the handle 119, handle shaft 111, front fork 101 and ski plate 102.

Further, when the body 200 is separated from the steering part 100 as mentioned above, the rear ski plate 204 will be separated from the front parts of the frame members 201 and 202. When the grip nut 206 is loosened and removed, the ski plate 204 will be separated in the rear part from the rear part of the frame and the frame and ski plate 204 will be separated from each other. When the grip nut 217 is removed, the saddle 212 will also be separated.

Similarly the frame members 201 and 202, rear ski plate 204 and saddle 212 can be separated.

The above-mentioned disassembly can be made by rotating the grip nuts and is therefore simple. The assembly can also be simply made. Therefore, when not in use, the above-mentioned respective parts can be disassembled and housed conveniently. This snow scooter can be transported disassembled and therefore can be contained in the trunk of a car to be transported to a skiing ground. Further, if aluminum or the like is used, it will become so light as to be carried like a ski by the operator. It can be assembled so easily as mentioned above even at the destination that no special skill is required.

Because the respective parts can be disassembled, they are easy to clean after use or to oil the rotating parts, and thus the maintenance will be quite convenient.

Figure 13:
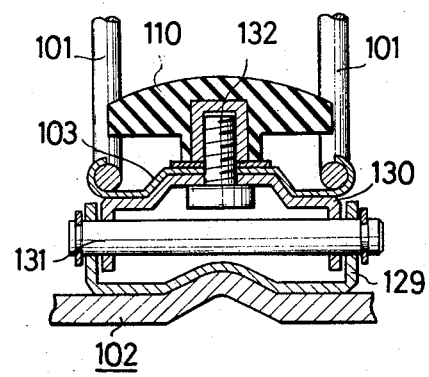
FIG. 13 is the same sectioned view as in FIG. 4 showing another embodiment than is mentioned above of a connection of a front ski plate with a front fork.
Figure 14:
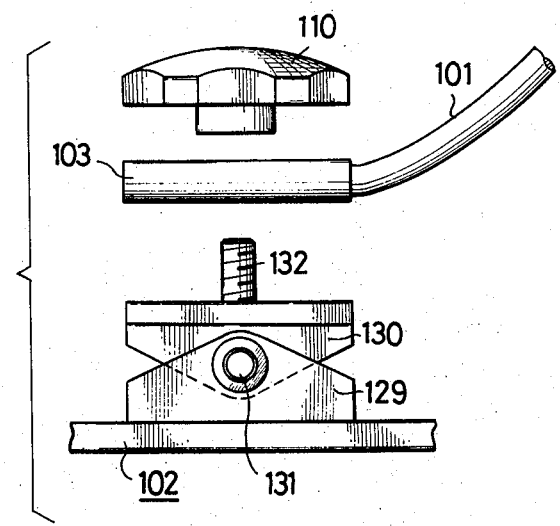
FIG. 14 is a disassembled side view of FIG. 13.

FIGS. 13 and 14 show another embodiment of the connection of the front ski plate 102 and front fork 101.

Channel-shaped members 129 and 130 as opposed to each other are rotatably connected with each other through a shaft 131 on the ski plate 102 and one member 129 is fixed on the ski plate. A bolt 132 is connected and secured to the upper member 130 and the lower connecting plate 103 for the front fork 101 is fitted on this bolt 132 and is screwed and connected with the grip nut 110 the same as is mentioned above.

Thus, the ski plate 102 can swing with the shaft 131 as a center and the front ski plate 102 can swing in response to the snow surface condition and can follow it.

We claim:

1. A disassemblable snow scooter, comprising:
   a steering part which consists of a front ski plate, a front fork separably connected in its lower part on said ski plate and separably connected in its upper part with the lower end of a handle shaft;
   said handle shaft being separably connected in its upper part with a steering handle and a part rotatably holding said handle shaft;
   a body which consists of a curved frame and rear ski plate and in which the rear part of said frame and the rear part of said rear ski plate are separably connected with each other;
   the forward end part of said rear ski plate and forward end part of said frame are respectively bent and overlapped on each other and are separably connected with said handle shaft holding part of said steering part;
   a saddle part for the operator provided in the center of said frame; and
   a foot resting part and braking parts to be pushed down with feet are provided on said rear ski plate.

2. A steering part of a snow scooter according to claim 1, wherein:
   connecting plates are provided in the upper and lower parts respectively, of said front fork;
   the lower connecting plate is engaged through a hole with a bolt projected on said front ski plate and is separably screwed and connected with a rotatable grip nut; and
   the upper connecting plate is engaged through a hole with a bolt projected in the lower end part of said handle shaft and is separably screwed and connected with a grip nut.

3. A snow scooter according to claim 1, wherein:
   a boss part of the handle is separably screwed and connected with the upper part of said handle shaft through a bolt and grip nut;
   a head tube is rotatably connected with the lower part of said handle shaft so as to be prevented from being pulled out; and
   a connecting part for separably connecting said body is formed in said head tube.

4. A steering part of a snow scooter according to claim 1, wherein:
   a connecting part consisting of upper and lower members rotatable forwardly and rearwardly with a shaft is provided on ski plate, a bolt is projected on said upper member of said connecting part, the lower connecting plate of said front fork is engaged through a hole with said bolt and is separably screwed and connected with a grip nut; and said front ski plate and front fork are connected with each other so as to be swingable forwardly and rearwardly.

5. A snow scooter according to claim 3, wherein:

said body includes said frame formed by symmetrically curving two bar members and holding the respective members as spaced from each other through spacers;

said frame is bent in its rear part;

a rear connecting plate provided in said part is separably screwed and connected on the rear part of said rear ski plate through a bolt and grip nut:

a connecting plate provided in the front part of said frame is overlapped on the bent forward end part of said rear ski plate and is separably screwed and connected with said connecting part of said head tube of said steering part through a bolt and grip nut; and said saddle is separably screwed and connected with said frame in the lower part through a connecting plate through a bolt and grip nut substantially on the center of said frame.

6. A braking device of a snow scooter according to claim 1, wherein:

right and left braking plates project to the right and left, respectively, of said body and are pivoted on said rear ski plate so as to be normally resiliently pressed upwardly and are rotated and lowered with both feet to bite into a snow surface to brake.

7. A braking device of a snow scooter according to claim 6, wherein:

said foot resting part and a member supporting a shaft are integrally provided on said rear ski plate;

the base parts of said right and left braking plates are rotatably fitted to said shaft through connecting rods; and said braking plates are normally resiliently pressed upwardly with a spring.

8. A snow scooter according to claim 1, in which:

a connecting plate provided in the lower part of said front fork is separably screwed and connected on said front ski plate through a bolt and grip nut;

said handle shaft is separably screwed and connected at its lower end with a connecting plate provided in the upper part of said front fork through a bolt and grip nut;

a boss part of said handle is separably screwed and connected with said upper part of said handle shaft through a bolt and grip nut;

a head tube regulated in its axial sliding is fitted to the lower part of said handle shaft so that said handle shaft may be rotatable;

a part connecting said body is provided in said head tube;

said curved frame of said body is formed by symmetrically curving two bar members and keeping the spacing between them through spacers and is separably screwed and connected at the rear end on said rear part of said rear ski plate through a connecting plate at the rear end of said frame through a bolt and grip nut;

said frame is bent in its forward end part to provide a connecting plate which is overlapped on the forward end part of said rear ski plate and is separably screwed and connected with said connecting part of said head tube of said handle shaft through a bolt and grip nut;

said saddle is separably screwed and connected on said frame through a bolt and grip nut;

a braking device in which said foot resting part and a member supporting a shaft is integrally provided on said rear ski plate;

said braking parts include braking plates;

base parts of said braking plates projected to the right and left of said rear ski plate are rotatably supported on said shaft with connecting rods; and said braking plates are normally resiliently pressed upwardly with a spring and are pushed down with both feet to be rotated and lowered so as to bite into snow to brake.

* * * * *